(12) United States Patent
Fini et al.

(10) Patent No.: US 12,227,459 B2
(45) Date of Patent: Feb. 18, 2025

(54) MIXED WASTE PLASTICS COMPATIBILIZERS FOR ASPHALT

(71) Applicants: Elham Fini, Phoenix, AZ (US); Robert Allen, Golden, CO (US); Albert Hung, Tempe, AZ (US); Matthew Green, Phoenix, AZ (US)

(72) Inventors: Elham Fini, Phoenix, AZ (US); Robert Allen, Golden, CO (US); Albert Hung, Tempe, AZ (US); Matthew Green, Phoenix, AZ (US)

(73) Assignees: Arizona Board of Regents on behalf of Arizona State University, Scottsdale, AZ (US); Alliance for Sustainable Energy, LLC, Golden, CO (US)

( * ) Notice: Subject to any disclaimer, the term of this patent is extended or adjusted under 35 U.S.C. 154(b) by 544 days.

(21) Appl. No.: 17/669,779

(22) Filed: Feb. 11, 2022

(65) Prior Publication Data
US 2022/0267211 A1    Aug. 25, 2022

Related U.S. Application Data

(60) Provisional application No. 63/148,423, filed on Feb. 11, 2021.

(51) Int. Cl.
C04B 26/26    (2006.01)
C04B 18/20    (2006.01)
(Continued)

(52) U.S. Cl.
CPC .............. *C04B 26/26* (2013.01); *C04B 18/20* (2013.01); *C04B 24/124* (2013.01); *C08J 11/28* (2013.01);
(Continued)

(58) Field of Classification Search
CPC ....... C04B 26/26; C04B 18/20; C04B 24/124; C08J 11/28; C08J 2367/02; C08J 2377/06
(Continued)

(56) References Cited

U.S. PATENT DOCUMENTS 5,041,310 A      8/1991  Williams et al.
9,528,001 B2 *  12/2016  Bhatnagar ............... C08L 75/02
(Continued)

FOREIGN PATENT DOCUMENTS

CN   106752056 A    5/2017
CN   107987866      5/2018
CN   108949282 A   12/2018

OTHER PUBLICATIONS

Høgsaa, B., E.H. Fini, J.de Claville Christiansen, A. Hung, M. Mousavi, E. A. Jensen, F. Pahlavan, T. H. Pedersen, and C. Sanporean, "A Novel Bio-Residue to Compatibilize Sodium Montmorillonite with Linear Low Density Polyethylene," Industrial & Engineering Chemistry Research, 2018, 57(4):1213-1224.
(Continued)

*Primary Examiner* — Michael M. Bernshteyn
(74) *Attorney, Agent, or Firm* — Fish & Richardson P.C.

(57) ABSTRACT

An asphalt modifier includes bitumen, polyolefin particles, and one or more alkyl terephthalamides. Preparing an asphalt modifier includes combining one or more alkyl terephthalamides, polyolefin particles, and bitumen, and dispersing the polyolefin particles in the bitumen to yield the asphalt modifier. Digesting polyethylene terephthalate includes combining polyethylene terephthalate with an alkylamine or carboxyalkylamine to yield a reaction mixture, and heating the reaction mixture to a temperature between about 20° C. and about 300° C. to yield an alkyl terephthalamide.

12 Claims, 2 Drawing Sheets

(51) Int. Cl.
*C04B 24/12* (2006.01)
*C08J 11/28* (2006.01)

(52) U.S. Cl.
CPC ........ *C08J 2367/02* (2013.01); *C08J 2377/06* (2013.01)

(58) Field of Classification Search
USPC .......................................................... 521/48
See application file for complete search history.

(56) References Cited

U.S. PATENT DOCUMENTS

| | | | |
|---|---|---|---|
| 10,465,063 B2* | 11/2019 | Oda | C08K 5/435 |
| 10,590,038 B1* | 3/2020 | Lee | C04B 40/0039 |
| 11,717,989 B2* | 8/2023 | Fini | C04B 28/12 |
| | | | 428/407 |
| 11,761,869 B2 | 9/2023 | Fini et al. | |
| 11,827,564 B2 | 11/2023 | Burton et al. | |
| 2005/0110179 A1 | 5/2005 | Loeffler-Lenz | |
| 2007/0149625 A1 | 6/2007 | Lark et al. | |
| 2011/0219679 A1 | 9/2011 | Budarin et al. | |
| 2012/0059084 A1 | 3/2012 | Brown et al. | |
| 2015/0274974 A1* | 10/2015 | Bhatnagar | C08G 18/6476 |
| | | | 524/705 |
| 2016/0045841 A1 | 2/2016 | Kaplan et al. | |
| 2017/0166722 A1 | 6/2017 | Zhamu et al. | |
| 2021/0002173 A1 | 1/2021 | Lee et al. | |
| 2021/0147751 A1 | 5/2021 | Fini et al. | |
| 2021/0247285 A1 | 8/2021 | Fini et al. | |
| 2021/0309858 A1* | 10/2021 | Seo | C08K 3/34 |
| 2022/0089487 A1 | 3/2022 | Burton et al. | |
| 2022/0355512 A1* | 11/2022 | Fini | B29B 9/16 |
| 2024/0059609 A1 | 2/2024 | Burton et al. | |

OTHER PUBLICATIONS

Hosseinnezhad, S., Kabir, S. F., Oldham, D., Mousavi, M., and Fini, E. H., "Surface functionalization of rubber particles to reduce phase separation in rubberized asphalt for sustainable construction," Journal of Cleaner Production, 2019, 225:82-89.

Kabir, Sk, M. Mousavi, E. H. Fini, "Selective Adsorption of Bio-oils' Molecules onto Rubber Surface and Its Effects on Stability of Rubberized Asphalt," Journal of Cleaner Production, 2020, 252(10):119856, 9 pages.

Merkel, D.R., W. Kuang, D. Malhotra, G. Petrossian, L. Zhong, K.L. Simmons, J. Zhang, and L. Cosimbescu, "Waste PET Chemical Processing to Terephthalic Amides and Their Effect on Asphalt Performance," ACS Sustainable Chem. Eng., 2020, 8:5615-5625.

Mousavi, M., B. Høgsaa, and E. H. Fini, "Intermolecular Interactions of Bio-modified Halloysite Nanotube within High-Impact Polystyrene and Linear Low-Density Polyethylene," Applied Surface Science, 2019, 473:750-760.

Mousavi, M., S. Hosseinnezhad, S. F. Kabir, Burnett, D. J., and E. H. Fini, "Reaction Pathways for Surface Activated Rubber Particles," Resources, Conservation & Recycling, 2019, 149:292-300.

Soni, R. K., Singh, S., and Dutt, K., "Studies on synthesis and characterization of N-alkyl terephthalamides using different amines from polyethylene terephthalate waste," Journal of Applied Polymer Science, 2010, 115(5):3074-3080.

Lam et al. "Microwave vacuum pyrolysis of waste plastic and used cooking oil for simultaneous waste reduction and sustainable energy conversion: Recovery of cleaner liquid fuel and techno-economic analysis" Renewable and Sustainable Energy Reviews, vol. 115 (Aug. 31, 2019): pp. 1-13.

Mahari et al. "Production of value-added liquid fuel via microwave co-pyrolysis of used frying oil and plastic waste" Energy, vol. 162 (Aug. 6, 2018): pp. 309-317.

* cited by examiner

MIXED WASTE PLASTICS COMPATIBILIZERS FOR ASPHALT

CROSS-REFERENCE TO RELATED APPLICATION

This application claims the benefit of U.S. patent application Ser. No. 63/148,423 filed on Feb. 11, 2021, which is incorporated herein by reference in its entirety.

STATEMENT OF GOVERNMENT INTEREST

This invention was made with government support under 1928795 awarded by the National Science Foundation and Contract No. DE-AC36-08GO28308 awarded by the Department of Energy. The government has certain rights in the invention.

TECHNICAL FIELD

This invention relates to waste plastics recycling, downcycling, and upcycling; compatibilizers for polyolefins; compatibilizers for bitumen; and plastic-modified asphalts.

BACKGROUND

Of the 4 million miles of public roads in the United States, 94% are paved with asphalt. Asphalt pavements degrade as they are exposed to UV rays and oxidation. Premature cracking and moisture damage further shorten their service life. Booming urban populations magnify these shortcomings by concentrating traffic. Modification of asphalts to increase performance and lifetime can be less than desirable due to environmental and economic costs.

SUMMARY

This disclosure describes mixed waste plastics compatibilizers for asphalt, composites including the mixed waste plastics compatibilizers, modified asphalts including the composites, and methods of preparing the compatibilizers, composites, and plastic-modified asphalts. The compatibilizers are formed from waste poly(ethylene terephthalate) (PET), and promote dispersion of polyolefin particles (e.g., low-density polyethylene (LDPE), high-density polyethylene (HDPE), linear low-density polyethylene (LLDPE), polypropylene (PP), or any combination or copolymer thereof) in bitumen. The composites include polyolefin particles dispersed in the bitumen with the PET compatibilizer. Asphalt is combined with the composite to yield the modified asphalts.

Preparation of the compatiblizer includes combining PET with a long-chain hydrocarbon amine reactant to digest the PET. The monomers and oligomers of the digested PET are used as surfactants to improve the mixing, dispersion, and interfacial bonding of polyolefin particles with bitumen to yield a composite. Crystalline PET particles present in the digested PET can impart additional strength to the composite. The properties of the composite can be tailored by selecting a hydrocarbon chain length of the polyolefin to avoid segregation and enhance asphalt healing capacity and resistance to aging. Thus, use of one waste stream (PET) to compatiblize another waste stream (e.g., polyolefin(s)) can be advantageous for a variety of reasons.

In a first general aspect, an asphalt modifier includes bitumen, polyolefin particles and one or more alkyl terephthalamides represented by the following structure:

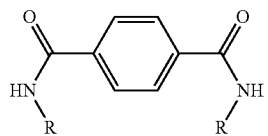

in which R is independently a C6 to C20 alkyl or C6-C20 carboxyalkyl, and at least one R is a C6 to C20 alkyl, and the polyolefin particles are dispersed throughout the bitumen.

Implementations of the first general aspect can include one or more of the following features.

In some implementations, each R is independently a C8 to C16 alkyl. Each R can be independently a C8, C12, or C16 alkyl. In some implementations, the polyolefin particles comprise low-density polyethylene (LDPE), high-density polyethylene (HDPE), linear low-density polyethylene (LLDPE), polypropylene (PP), or any copolymer or combination thereof. The one or more alkyl terephthalamides can serve as an interface between the bitumen and the polyolefin particles.

In some implementations, the asphalt modifier comprises up to 20 wt % of the polyolefin particles. The asphalt modifier can comprise up to 5 wt % of the one or more alkyl terephthalamides. In certain implementations, the asphalt modifier further includes poly(ethylene terephthalate) oligomers.

In a second general aspect, making an asphalt modifier includes combining: one or more alkyl terephthalamides represented by the following structure:

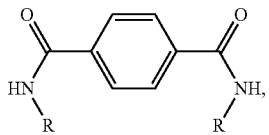

in which each R is independently a C6 to C20 alkyl or C6-C20 carboxyalkyl, and at least one R is a C6 to C20 alkyl; polyolefin particles; and bitumen, and dispersing the polyolefin particles in the bitumen to yield the asphalt modifier.

Implementations of the second general aspect can include one or more of the following features.

Some implementations include preparing the one or more alkyl terephthalamides from waste poly(ethylene terephthalamide). Dispersing the polyolefin particles in the bitumen can occur at a temperature in a range between about 150° C. and about 200° C.

In a third general aspect, digesting polyethylene terephthalate includes combining polyethylene terephthalate with an alkylamine or carboxyalkylamine to yield a reaction mixture, and heating the reaction mixture to a temperature between about 20° C. and about 300° C. to yield an alkyl terephthalamide.

Implementations of the third general aspect can include one or more of the following features.

In some implementations, the polyethylene terephthalate and the alkylamine are combined in a molar ratio of at least 1:2n, where n represents a number of repeat units in the polyethylene terephthalate. In certain implementations, the polyethylene terephthalate and the alkylamine are combined in a molar ratio of less than 1:2n, where n represents a number of repeat units in the polyethylene terephthalate. A melting point of the alkyl terephthalamide can exceed the melting point of the alkylamine. In certain implementations, the alkylamine includes a C6-C20 alkylamine. The poly(ethylene terephthalate) can be particulate. The poly(ethylene terephthalate) can be in the form of flakes.

In some implementations, the alkyl terephthalamide is represented by the following structure:

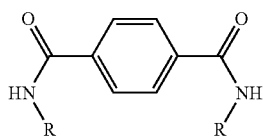

in which each R is independently a C6 to C20 alkyl or C6-C20 carboxyalkyl, and at least one R is a C6 to C20 alkyl. In certain implementations, digesting polyethylene terephthalate further includes combining the asphalt modifier with asphalt to yield a modified asphalt.

In some implementations, a modified asphalt includes the asphalt modifier of the first general aspect.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

This disclosure describes a process to turn waste plastics into modifiers for asphalt pavements to extend pavement service life. Poly(ethylene terephthalate) (PET) is digested to create a terephthalamide compatibilizer. Digesting the PET includes combining waste PET with a long-chain hydrocarbon amine reactant and depolymerizing the PET to yield terephthalamide monomers and oligomers. In some implementations, digesting the PET includes melting the PET with the amine reactant to yield a mixture, and feeding the mixture through an extruder for continuous or batch production of a compatiblizer that includes terephthalamide. The molten PET (e.g., T>~240° C.) is free or substantially free of crystallinity and promotes fast digestion kinetics. In some implementations, the amine reactant plasticizes the PET at moderate temperatures (100° C.<T<200° C.), thereby reducing viscosity and initiating aminolysis. This yields a semi-crystalline PET that is partially reacted due to relatively fast digestion kinetics of the amorphous component, and results in compatibilizer that includes a mixture of terephthamides and crystalline PET. Terephthalamides resulting from these implementations have better hydrolytic stability than ester-based phthalates.

Figure 1:
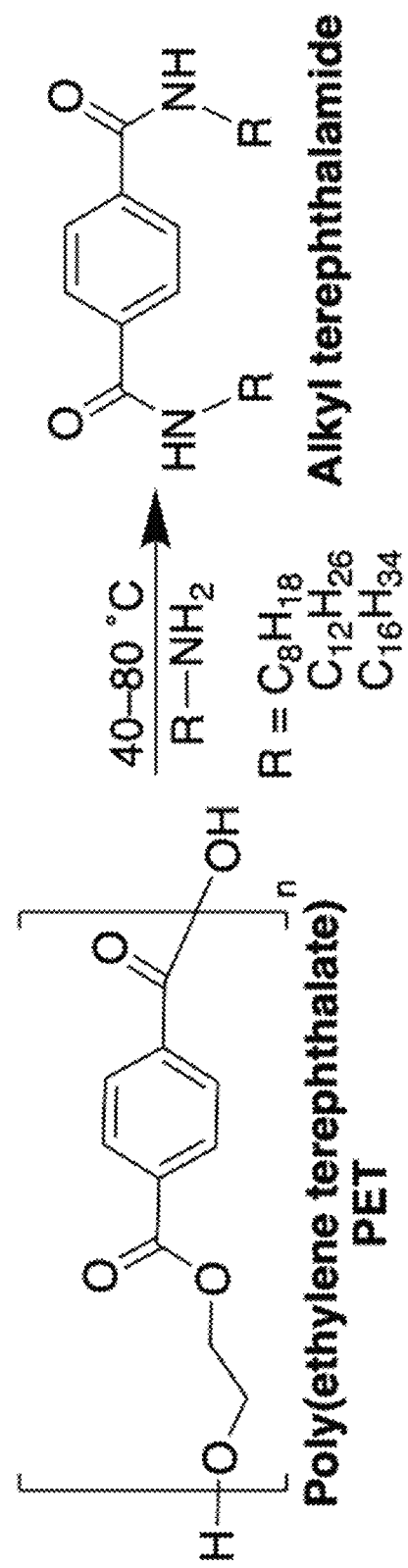
FIG. 1 depicts the reaction of poly(ethylene terephthalate) (PET) with long-chain alkylamines to yield alkyl terephthalamides.

FIG. 1 depicts the reaction of PET with long-chain alkylamines to yield long chain alkyl terephthalamides. Suitable reaction temperatures are from about 20° C. to about 300° C. The long chain hydrocarbon amines are represented as R-NH$_2$, where R is a linear or branched C6-C20 alkyl or linear or branched C6-20 carboxyalkyl (e.g., C8-C16, or any combination of C8, C9, C10, C11, C12, C13, C14, C15, and C16, such as C8, C12, and C16). The carboxyl groups of the PET oligomer are terminated with alkyl chains using an alkylamine. The temperature at which the PET is digested, or processing temperature, is typically between the melting point and the boiling point of the alkylamine. The upper temperature at which the PET is digested can be increased by protonating the alkylamine to yield the ammonium salt. To perform the digestion, PET particles (e.g., flakes) are combined with the alkylamine at a temperature in a range between about 20° C. and about 300° C.

The stoichiometry (ratio of PET:alkylamine) and temperature can be selected based at least in part on the alkylamine to control the reaction kinetics as well as the yield and purity of the resulting alkyl terephthalamide. In some implementations, the polyethylene terephthalate and the alkylamine is combined in a molar ratio of at least 1:2n (e.g., at least 1:2.1n) or less than 1:2n, where n represents a number of repeat units in the polyethylene terephthalate. The reaction progress can be monitored as a function of time using one or more of $^1$H NMR spectroscopy, mass spectrometry, melt index or rheological techniques, size exclusion chromatography. The resulting alkyl terephthalamides are shown below, where each R is independently a linear or branched C6 to C20 alkyl or a linear or branched C6-C20 carboxyalkyl, and at least one R is a C6 to C20 alkyl. That is, the alkyl terephthalamide can be a bis(alkyl) terephalamide or a mono(alkyl) terephthamide.

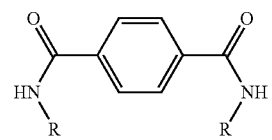

These alkyl terephthalamides have a higher melting point than the corresponding alkylamine precursors, allowing for easy separation by hot filtration to remove the liquid alkylamine.

Figure 2:
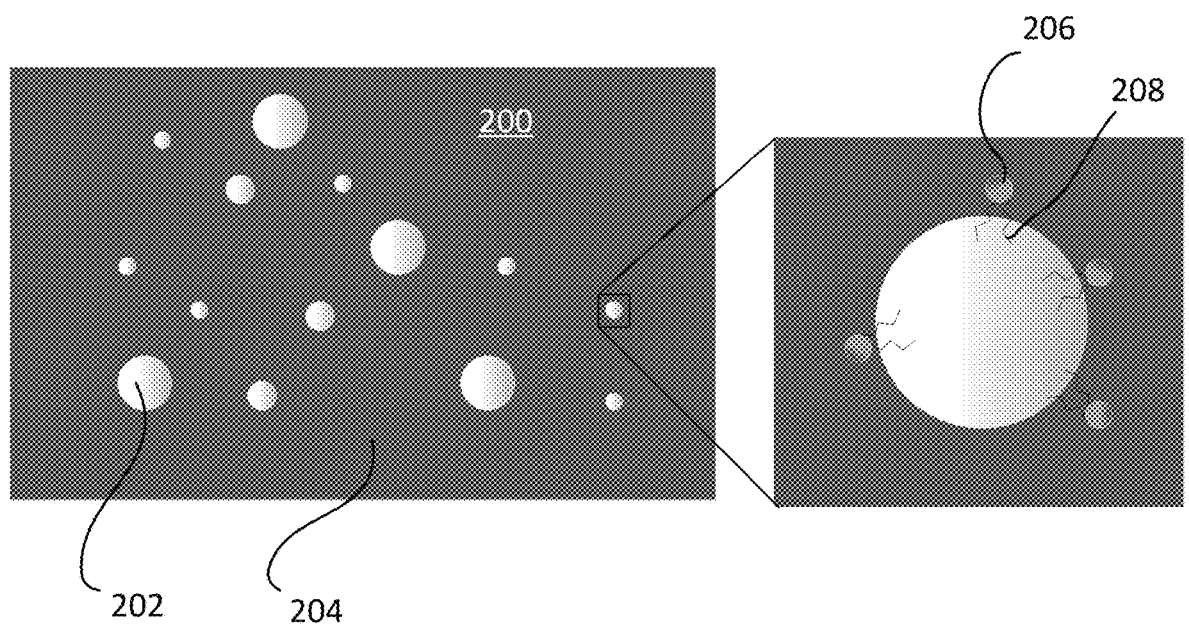
FIG. 2 depicts solubiliztion of polyolefin particles in a bitumen matrix with a PET-derived compatibilizer.

FIG. 2 depicts a composite 200 formed by the combination of the alkyl terephthalamide and polyolefin particles 202 with bitumen 204. The polyolefin particles 202 can include low-density polyethylene (LDPE), high-density polyethylene (HDPE), linear low-density polyethylene (LLDPE), or a copolymer or combination thereof. A largest dimension of the polyolefin particles is typically in a range between about 1 mm and about 100 cm. In some cases, a largest dimension of the polyolefin particles is in a range between about 1 mm and about 10 mm. The processing temperature is typically in a range between about 30° C. to about 80° C. greater than the meleting temperature of the polyolefin particles (e.g., between about 150° C. and about 200° C.). The composite typically includes up to about 20 wt % of the polyolefin particles, and up to about 10 wt % of the alkyl terephthalamides. The alkyl terephthalamides are amphiphilic, with a polar terephthalamide head group 206 and a nonpolar alkyl tail 208, and can serve as compatibilizers to disperse the polyolefin particles in the bitumen. That is, the C6-C20 hydrocarbon chains on the alkyl terephthalamide are nonpolar, and can preferentially orient toward the polyolefin particles, while the polar portion of the terephthalamide can preferentially orient toward the bitumen. This preferential arrangment can help disperse the polyolfin particles 202 in the bitumen 204 to yield a composite 200, as depicted in FIG. 2.

The composite can be combined with asphalt as an asphalt modifier to yield a modified asphalt. The asphalt can be combined with the asphalt modifier at a temperature in a range between about 150° C. to about 175° C. (e.g., "hot mix") or less than about 100° C. (e.g., "warm mix"). The temperature is typically selected to be below the melting point of the polyolefin (e.g., below about 100° C. for LDPE or LLDPE or below about 180° C. for HDPE). In some cases.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. An asphalt modifier comprising:
   bitumen;
   polyolefin particles; and
   one or more alkyl terephthalamides represented by the following structure:

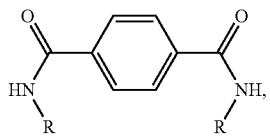

wherein each R is independently a C6 to C20 alkyl or C6-C20 carboxyalkyl, and at least one R is a C6 to C20 alkyl, and the polyolefin particles are dispersed throughout the bitumen.

2. The asphalt modifier of claim 1, wherein each R is independently a C8 to C16 alkyl.

3. The asphalt modifier of claim 2, wherein each R is independently a C8, C12, or C16 alkyl.

4. The asphalt modifier of claim 1, wherein the polyolefin particles comprise low-density polyethylene (LDPE), high-density polyethylene (HDPE), linear low-density polyethylene (LLDPE), polypropylene (PP), or any copolymer or combination thereof.

5. The asphalt modifier of claim 1, wherein the one or more alkyl terephthalamides serve as an interface between the bitumen and the polyolefin particles.

6. The asphalt modifier of claim 1, wherein the asphalt modifier comprises up to 20 wt % of the polyolefin particles.

7. The asphalt modifier of claim 1, wherein the asphalt modifier comprises up to 5 wt % of the one or more alkyl terephthalamides.

8. The asphalt modifier of claim 1, further comprising poly(ethylene terephthalate) oligomers.

9. A method of making the asphalt modifier of claim 1, the method comprising:
   combining:
      one or more alkyl terephthalamides represented by the following structure:

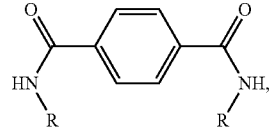

wherein each R is independently a C6 to C20 alkyl or C6-C20 carboxyalkyl, and at least one R is a C6 to C20 alkyl;
      polyolefin particles; and
      bitumen; and
   dispersing the polyolefin particles in the bitumen to yield the asphalt modifier.

10. The method of claim 9, further comprising preparing the one or more alkyl terephthalamides from waste poly(ethylene terephthalamide).

11. The method of claim 9, wherein dispersing the polyolefin particles in the bitumen occurs at a temperature in a range between about 150° C. and about 200° C.

12. A modified asphalt comprising the asphalt modifier of claim 1.

* * * * *